(12) United States Patent
Toda

(10) Patent No.: US 11,375,068 B2
(45) Date of Patent: Jun. 28, 2022

(54) IMAGE FORMING APPARATUS HAVING MULTIPLE ANTENNAS

(71) Applicant: CANON KABUSHIKI KAISHA, Tokyo (JP)

(72) Inventor: Kozo Toda, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/890,657

(22) Filed: Jun. 2, 2020

(65) Prior Publication Data

US 2020/0389563 A1 Dec. 10, 2020

(30) Foreign Application Priority Data

Jun. 7, 2019 (JP) .............................. JP2019-107295
Jun. 1, 2020 (JP) .............................. JP2020-095578

(51) Int. Cl.
*H04N 1/00* (2006.01)
*H04W 4/80* (2018.01)

(52) U.S. Cl.
CPC ..... *H04N 1/00315* (2013.01); *H04N 1/00411* (2013.01); *H04W 4/80* (2018.02)

(58) Field of Classification Search
None
See application file for complete search history.

(56) References Cited

U.S. PATENT DOCUMENTS

| 9,774,362 B1* | 9/2017 | Sammeta | H04B 1/40 |
| 2014/0146334 A1* | 5/2014 | Yuzawa | H04N 1/04 |
| | | | 358/1.13 |
| 2015/0331648 A1* | 11/2015 | Tomomatsu | G06F 3/1292 |
| | | | 358/1.15 |
| 2016/0066123 A1* | 3/2016 | Ko | H04W 4/70 |
| | | | 455/41.1 |

FOREIGN PATENT DOCUMENTS

| JP | 2013-147015 | 8/2013 |
| JP | 2018-170726 | 11/2018 |
| JP | 2019-155857 | 9/2019 |

* cited by examiner

*Primary Examiner* — Andrew H Lam
(74) *Attorney, Agent, or Firm* — Venable LLP

(57) ABSTRACT

An image forming apparatus includes an operating unit, including a display portion, for being operated by a user; an image forming unit for forming an image on a sheet; an outer cover provided below the operating unit and constituting at least a part of the outer casing; a first antenna communicatable with a mobile communication terminal, the first antenna portion being provided at a position covered by the outer cover and below the operating unit; a second antenna communicatable with a mobile communication terminal having a communicatable range broader than that of the first antenna, and a target portion provided on the outer cover and functioning as a mark to which the mobile communication terminal is to be approached. The communicatable range of the first antenna portion is within the communicatable range of the second antenna portion.

19 Claims, 15 Drawing Sheets

IMAGE FORMING APPARATUS HAVING MULTIPLE ANTENNAS

FIELD OF THE INVENTION AND RELATED ART

The present invention relates to an image forming apparatus, such as a printer, a copying machine, a facsimileing machine or a multifunction machine, which is provided with such a wirelessly communicating function that makes it possible for the image forming apparatus to wirelessly communicate with a wireless communication terminal of a portable device.

In recent years, there have been proposed image forming apparatuses which can wirelessly enable a user of the image forming apparatus to perform such operation as printing photographs and documents, receiving scanned data, and uploading data into cloud storage service, with the use of the wireless communication terminal of a portable device, in order to make it easier for the user to use the image forming apparatuses (Japanese Laid-open Patent Application No. 2018-170726). In the case of the image forming apparatus disclosed in Patent Document 1 (Japanese Laid-open Patent Application No. 2018-170726), the portion of the apparatus, in the proximity of which the communication terminal of a mobile device is to be positioned by a user to enable the apparatus to wirelessly receive data, signals, etc., is positioned a certain distance away from the portion of the apparatus, in the proximity of which an IC card is to be placed by a user.

By the way, in recent years, various short distance wireless communication standards such as NFC (Near Field Communication) standard, and BLE (Blue tooth (registered trade mark) Low Energy communication standard have been widely in use. These short distance wireless communication standards are used for an IC card for personal identification or the like, connection authentications for enabling a portable wireless device and an image forming apparatus to communicate each other via Wi-Fi (registered trade mark), or the like purpose. Here, "connection authentication for Wi-Fi communication" means that the wireless communication terminal of a portable device obtains the specific ID, password, or the like of the image forming apparatus, by communication with the image forming apparatus with the use of a short distance wireless communication stands (so-called "pairing"). It has been thought to transmit image data or the like from the wireless communication terminal of a portable device to an image forming apparatus via "Wi-Fi" by paring a portable device and an image forming apparatus with the use of a short distance communication standard such as NFC, BLE, or the like (so-called "hand-over").

In recent years, various wireless communication terminals have become available for a portable communication device. Some of them are compatible with only NFC standard, whereas other are compatible with only FLE standard. Thus, some image forming apparatuses are provided with multiple antennas which correspond one for one with multiple short distance wireless communication standards. In a case where multiple antennas which correspond with multiple short distance communication standards such as NFC standard and BLE communication standard are mounted on an image forming apparatus, in the same manner as they are mounted on the apparatus disclosed in Patent Document 1, the portion of the image forming apparatus, close to which a user is to place the communication terminal of a given portable device is made different in position from the portion of the image forming apparatus, close to which a user is to place the communication terminal of another portable device which is different in wireless communication standard from the first one. However, it is rather difficult to find out where on the image forming apparatus the communication terminal of a portable device, or an IC card is to be placed close. In other words, the image forming apparatus in Document 1 is desired to be improved in terms of usability.

The present invention was made in consideration of the issued described above. Thus, the primary object of the present invention is to provide an image forming apparatus which is capable of wirelessly communicating with multiple types of portable device which are different in wireless communication standard, as the wireless communication terminal of a portable device is placed close to a preset portion of the image forming apparatus, and yet, is as easy to use as any other image forming apparatus enabled to wirelessly communicate with a portable device.

SUMMARY OF THE INVENTION

According to an aspect of the present invention, there is provided an image forming apparatus comprising an operating unit including a display portion and configured to be operated by a user; an image forming unit configured to form an image on a recording material; an outer cover provided below said operating unit and constituting at least a part of said outer casing; a first antenna portion communicatable with a mobile communication terminal, said first antenna portion being provided at a position covered by said outer cover and below said operating unit; a second antenna portion communicatable with a mobile communication terminal having a communicatable range broader than that of said first antenna portion; and a target portion provided on said outer cover and configured to function as a mark to which the mobile communication terminal is to be approached, wherein the communicatable range of said first antenna portion is within the communicatable range of said second antenna portion.

Further features of the present invention will become apparent from the following description of exemplary embodiments with reference to the attached drawings.

DESCRIPTION OF THE EMBODIMENTS

<Image Forming Apparatus>

Figure 1:
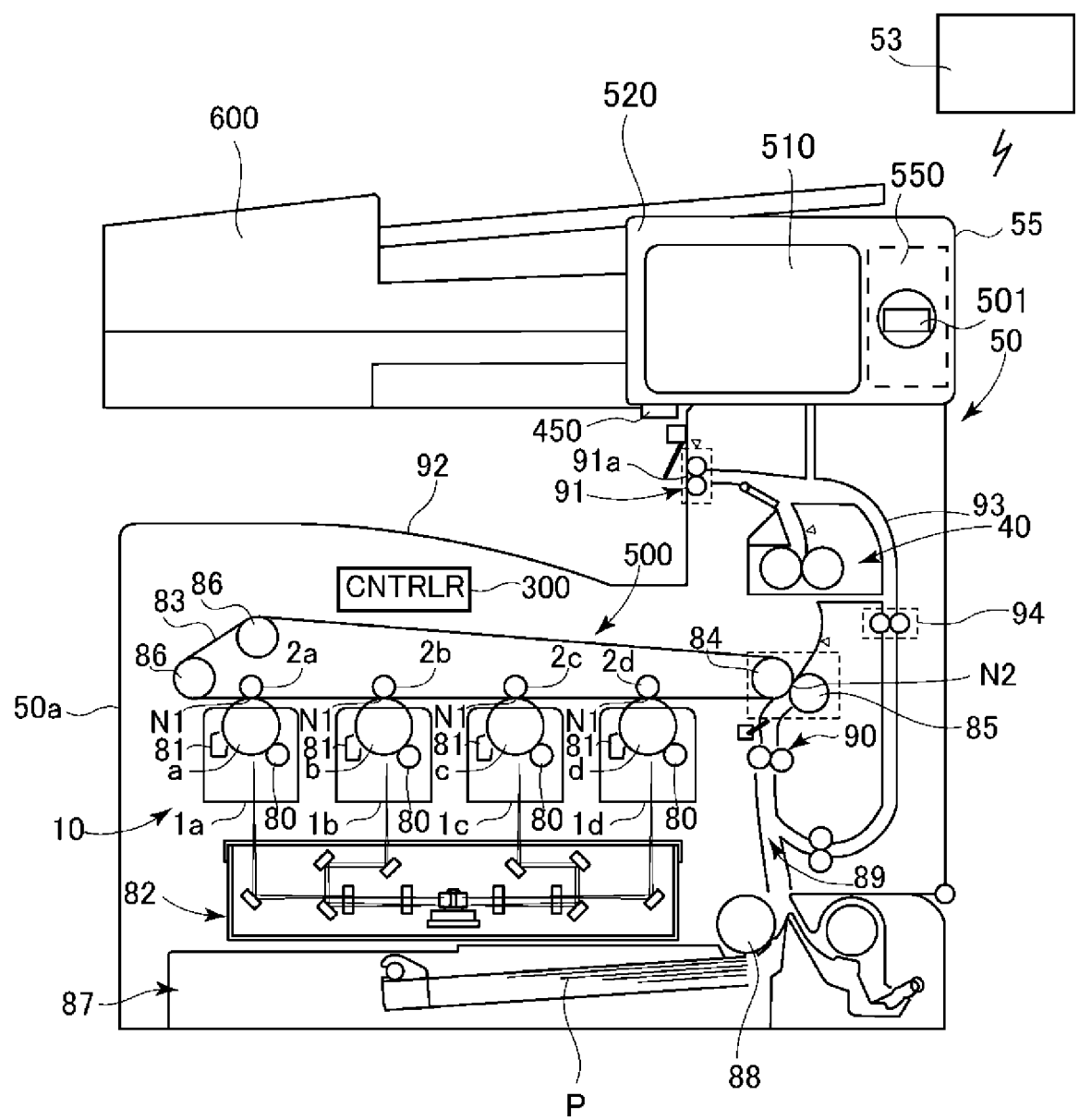
FIG. 1 is a schematic view of the image forming apparatus in one of the preferred embodiments of the present invention.
Figure 2A:
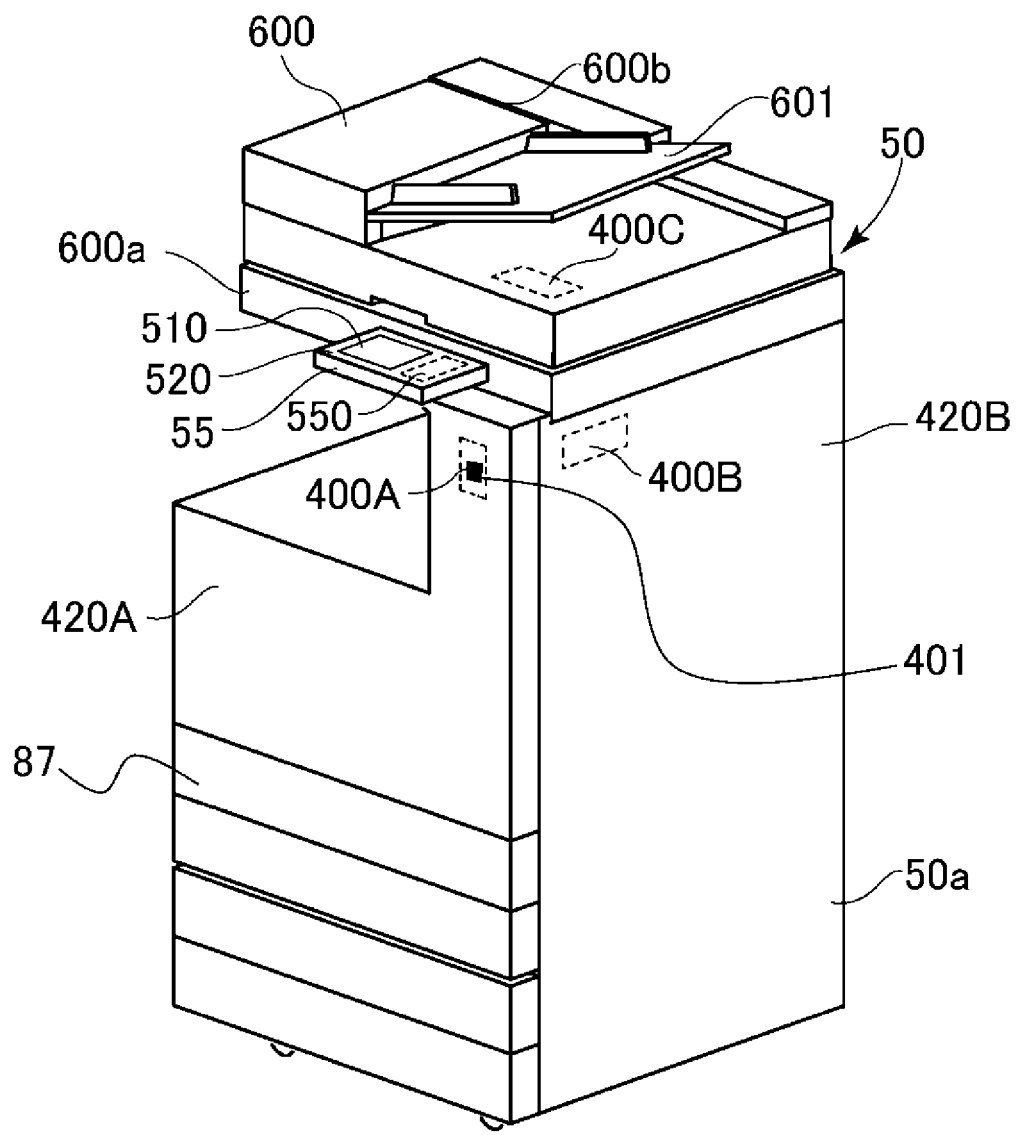
FIG. 2A is an external perspective view of the image forming apparatus shown in FIG. 1.
Figure 2B:
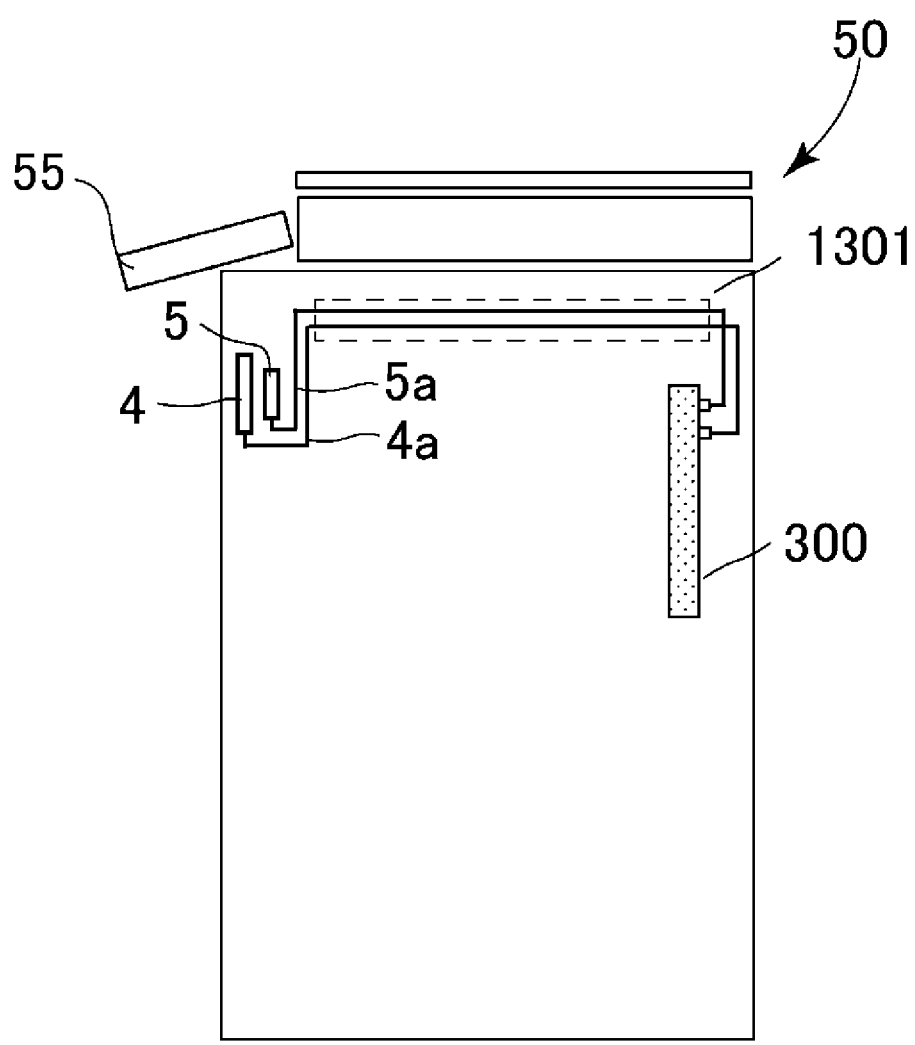
FIG. 2B is a side view of the image forming apparatus shown in FIG. 1.
Figure 2C:
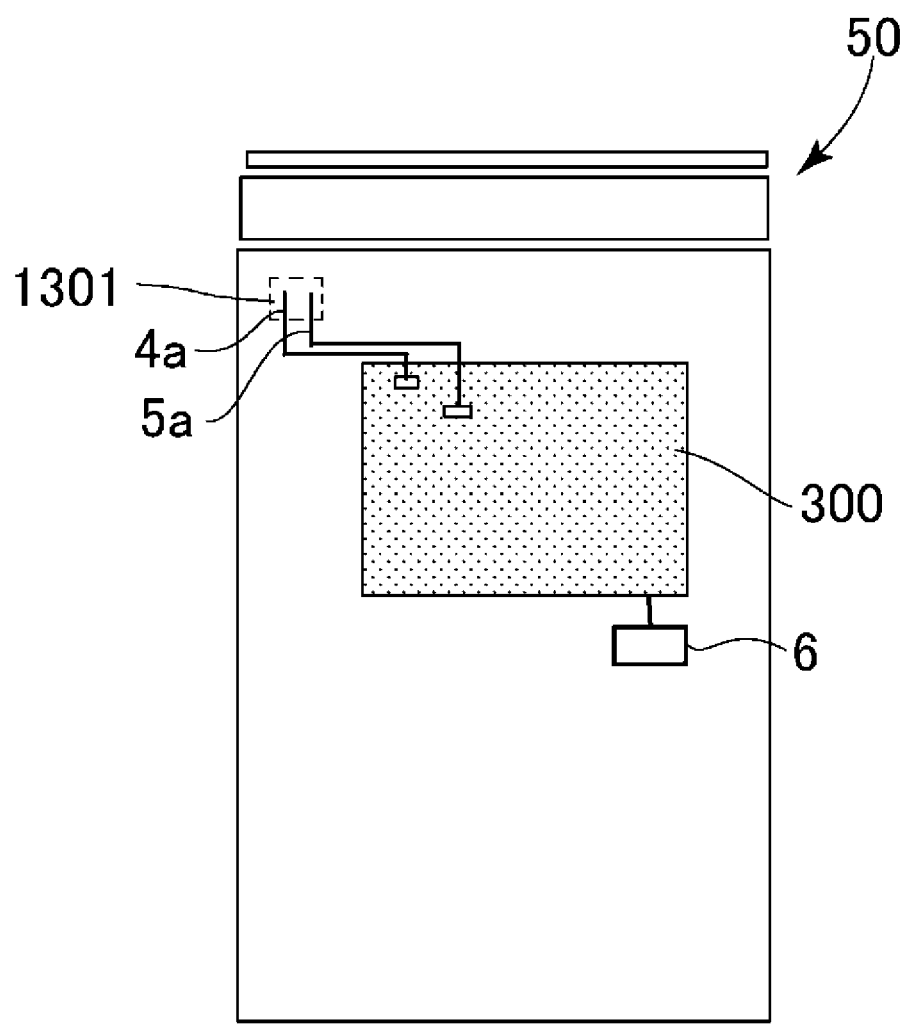
FIG. 2C is a rear view of the image forming apparatus shown in FIG. 1.

To begin with, referring to FIGS. 1-2C, the image forming apparatus in this embodiment of the present invention is described. The image forming apparatus 50 shown in FIG. 1 is an electrophotographic full-color printer of the so-called tandem type. It is capable of forming a toner image on a sheet of recording medium, based on the image data sent from an original reading apparatus 600 positioned on the main assembly 50a, external terminal of a computer, and the wireless communication terminal of a portable device, which can be wirelessly connectible to the control portion of the main assembly 50a.

The original reading apparatus 600 has a reading apparatus 600a which reads an original image, and an automatic document feeder 600b which conveys the original to the reading apparatus 600a. The reading apparatus 600a is provided with a first reading portion, an original placement glass plate, and a glass plate for reading an original while the original is moved. The image forming apparatus 50 is structured so that the automatic document feeder 600b can be pivotally moved away from the original placement glass plate of the reading apparatus 600a. As an original is placed on the original placement glass plate, it is pressed by a pressing portion of the automatic document feeder 600b, which faces the original placement glass plate, and is read by the first reading portion, which begins to operate in response to the starting of the copying of the original. As an original is placed on a tray 601, it is sent to the glass platen for reading the original while the original is moved by the original conveying portion which begins to operate in response to the starting of the copying or scanning of the original. Then, the image on the first surface of the original is read by the first reading portion. Then, the image on the second surface of the original, that is, the image on the opposite surface of the image from the first surface, is read by the second reading portion. The data obtained by the reading of the original by the first and second reading portions are used for the operation for forming an electrostatic latent image on the peripheral surface of each of the photosensitive drums a-d, by a laser scanner 82 which will be described later.

In this embodiment, the image forming apparatus 50 has an image formation unit 500 as an image forming means for forming an image on a sheet P of recording medium, in its main assembly 50a. Here, the main assembly 50a comprises: a supporting frame formed by combining multiple pieces of metallic plate; and external covers 420A and 420B, which cover internal units, more specifically the supporting frame, image formation unit 500, etc., supported by the supporting frame, etc. By the way, as recording medium, a sheet of various medium can be mentioned. For example, a sheet of ordinary paper, cardstock, rough paper, embossed paper, coated paper, glossy paper, printing paper, plastic film, fabric, etc., may be mentioned.

Next, the image formation unit 500 is concretely described. The image formation unit 500 is provided with an image forming portion 10 which is capable of forming yellow, magenta, cyan, and black images. The image forming portion 10 has image formation units 1a, 1b, 1c, and 1d aligned in tandem in the direction parallel to the bottom portion of the loop which an intermediary transfer belt 83 forms. Each of the image formation units 1a-1d has a rotational photosensitive drum (a, b, c or d), a charging device 80, and a developing device 81. The photosensitive drum is charged by the corresponding charging device 80, and then, is scanned by (exposed to) a beam of laser light emitted from a laser scanner 32 while being modulated with the image data. As a result, an electrostatic latent image, which is in accordance with the image data, is effected on the peripheral surface of the photosensitive drum. This electrostatic latent image is developed into a visible image, that is, an image formed of toner, by the developing device 81, with use of developer. The image formed toner on the peripheral surface of each photosensitive drum is transferred (primary transfer) onto the intermediary transfer belt 83, in a primary transfer nip N1, by the application of the primary transfer bias to the primary transfer roller 2a-2d, which are positioned on the inward side of the loop which the intermediary transfer belt 83 forms, in such a manner that they oppose the photosensitive drums a-d, respectively.

The intermediary transfer belt 83 is suspended and tensioned by a secondary transfer inside roller 84, and multiple suspension-tension rollers 86. A secondary transfer outside roller 85 is positioned so that it opposes the secondary transfer inside roller 84, with the presence of the intermediary transfer belt 83 between itself and secondary transfer inside roller 84, forming thereby a secondary transfer nip N2 which is for transferring the toner images on the intermediary transfer belt 83, onto a sheet P of recording medium.

In the bottom portion of the image forming apparatus 50, a sheet feeder cassette 87, in which multiple sheets P of recording medium are storable in layers, is disposed. The multiple sheets P in the cassette 87 are fed one by one into a sheet passage 89 by a feed roller 88. Then, each sheet P is sent to a pair of registration rollers 90 through the sheet passage 89. The pair of registration roller 90 correct the sheet P in attitude by catching the sheet P while remaining stationary, if the sheet P happens to be delivered askew. Then, they convey the sheet P to the secondary transfer nip N2 in synchronism with the timing with which toner images are formed on the intermediary transfer belt 83 by the image formation units 1a-1d. Then, as the secondary transfer bias is applied to the second transfer outside roller 85, the toner images on the intermediary transfer belt 83 are transferred (secondary transfer) onto the sheet P, in the secondary transferring portion N2. Then, the sheet P is conveyed to a fixing apparatus 40. In the fixing apparatus 40, the sheet P is conveyed by a pair of rollers through the fixation nip which the pair of rollers forms, while remaining sandwiched by the pair of rollers. Consequently, the toner images are heated while being pressed, becoming fixed to the sheet P.

In a case where a toner image is formed on only one of two surfaces of a sheet P of recording medium, the sheet P is discharged onto a delivery tray 92 by a pair of discharge roller 91, after being conveyed through the fixing apparatus 40. On the other hand, in a case where a toner image is formed on both surfaces of the sheet P, the sheet P is conveyed backward (switched in direction) by the pair of discharged rollers 91 toward a two-side image formation passage 93. After being conveyed into the two-sided image formation passage 93, the sheet P is returned to the sheet passage 89 by a sheet passage 94. Then, it is put through the same process as the one it was put when a toner image was formed on the first surface of the sheet P, to form a toner image on the second surface of the sheet P. After the formation of a toner image on the second surface of the sheet P and the fixation of the toner image, the sheet P is discharged into the delivery tray 92 by the pair of discharge rollers 91.

Referring to FIG. 1, the image forming apparatus 50 has a controlling portion 55 having a display 51 through which operational commands can be inputted by a user. In the case of this embodiment, the display 510 can display an input screen having soft keys (unshown) which resemble in shape actual keys such as a switch, a button, and ten-keys. In a case where soft keys are displayed on the display 510, as a user touches one of the soft keys, one of various functions of the image forming apparatus 50 assigned to the key is carried out. That is, the display 510 has: such a display panel as liquid crystal display, an organic EL display, and a touch panel of the so-called static electricity capacity type, resistance film type, or the like, which is touchable a user. The touch panel enables a user to input various data related to image formation, and such a command as an image formation start command, an image formation end command, etc., by touching one of the soft keys on the display. The edge portions of the control portion 55 are covered by the external cover 520, which has such an opening that allows the display screen of the display 51 is exposed. Referring to FIG. 2A, the control portion 55 is positioned on the front side of the main assembly 50a, that is, where a user will be when the user uses the image forming apparatus 50, and also, on the front side of the reading apparatus 600a. By the way, the control portion 55 may be attached to the main assembly 50a with a tilting mechanism, variable-angle mechanism in such a manner that it can be moved upward or downward with the external cover 520 to be changed in angle. In this embodiment, the display 510 is positioned so that it is on the upstream side of the delivery tray 92 in terms of the recording medium conveyance direction (right side in FIG. 1), more specifically, on the upstream side of the outlet 91a of the pair of discharge rollers 91, through which the sheet P is discharged, in terms of the recording medium conveyance direction.

<Target Portion of Referential Image Forming Apparatus>

Some image forming apparatuses (50) are provided with a target area, in which a user is to place the communication terminal 53 to place the terminal close to a preset area of the main assembly 50a. FIG. 1 shows the image forming apparatus 50 (referential example of image forming apparatus), the target portion of the control portion 55 is near the display 510 on the external cover 520. Further, FIG. 1 shows a mark 501 which can be used by a user to place the communication terminal 53 of a portable device close the target 550. In a case where the control portion 55 is provided with the target portion 550 as described above, it is possible that the hand, or fingers thereof, by which the communication terminal 53 of a portable device is held, will come into contact with the display 510. If the hand, or the fingers thereof, come into contact with the terminal 53, it is possible that the control portion 55 will erroneously determine that one of the soft keys has just been touched, and therefore, causes the image forming apparatus 50 to erroneously operate. For example, if the hand or the fingers thereof, which is holding the terminal 53 of a portable device happens to come into contact with one of the software keys, for example, the start key for starting an image forming operation, a reading operation, or the like, which is on the display 510, when a user tries to place the communication terminal of a portable device in the proximity of the target area of the control portion 55, it is possible that the image forming apparatus 50 will start an operation which is unintended by a user.

<Target Portion of Image Forming Apparatus in this Embodiment>

In this embodiment, therefore, the target portion is positioned outside the control portion 55 of the image forming apparatus 50. For example, an external cover 420A, which is a part of the external cover 420 positioned in such a manner that it surrounds the main assembly 50a, is provided with a target portion 400A as a portion which is an area in which a user is to place the communication terminal 53 of a portable device. This portion is where a user can easily place the communication terminal 53 of a hand-held portable device. Further, this portion is positioned lower than the display 510 of the main assembly 50a of the image forming apparatus 50. Therefore, it does not occur that when a user places the communication terminal 53 of a portable device close to the target portion 400A, the hand of the user, or fingers of the user come into contact with the display 510. The target portion 400A is provided with a mark 401, which is a mark for showing a user where the user is to place the communication terminal 53 of a portable device to put the terminal 53 close to the target 400A. The mark 401 is in the form of a seal pasted to the external cover 420, or is formed on the external cover 400 by silk-printing. The provision of the target portion 400A with the mark 401 enables a user to accurately recognize where the communication terminal 53 of a portable device is to be placed, ensuring that the communication terminal 53 of a portable device is put close to the control portion 55. By the way, it is desired that the mark 401 is attached to the portion of external cover 420A, which is closer to the NFC circuit 4 (more specifically, NFC antenna portion) which is narrower in communication range that the BLE communication circuit 5 (more specifically, BLE antenna portion) which will be described later. That is, the mark 401 is shared by the BLE communication circuit 5 and NFC circuit 4. This setup ensures that as the communication terminal 53 of a portable device is placed close to the target portion 400A, the wireless communication is established between the communication terminal 53 of a portable device and the control portion 55 of the image forming apparatus 50, regardless of whichever short distance communication standard is in use, the BLE communication standard or NFC standard.

Referring to FIG. 2, in this embodiment, by the way, the external cover 420A which is on the front side of the main assembly 50a of the image forming apparatus 50 is provided with the target portion 400. However, this embodiment is not intended to limit the present invention in scope regarding where the target portion 400 is positioned. For example, the portion 420B, which is a side portion of the external cover 420 positioned in a manner to surround the main assembly 50a of the image forming apparatus 50, may be provided with a target portion 400B in place of the target portion 400, or the original reading apparatus 600 (top portion, for example, of original reading apparatus 600b, for example) may be provided with a target portion 400C in place of the target portion 400. As described above, the target portions 400A-C are all positioned on the front side of the rear surface of the image forming apparatus 50. Therefore, it is easier for a user to place the communication terminal 53 of a portable device close to the target portion 400.

Next, the structure of an example of an image forming apparatus, the target portion 400 of which is positioned where the target portion 400A is in part (a) of FIG. 2, is described about its structure. By the way, referring to FIG. 2, the external cover 420A provided with the target portion 400A is positioned lower than the portion of the external cover 420 of the image forming apparatus 50, which is positioned lower than the control portion 55, and above the sheet feeder cassette 87, in terms of the vertical direction. Further, the external cover 420A is a part of the external cover 420 of the image forming apparatus 50, which is on the front side of the external cover 420B which covers the lateral sides of the image forming apparatus 50.

As will be described later in greater detail, the image forming apparatus 50 is equipped with the NFC circuit 4 (FIG. 5A, for example) which is capable of wirelessly communicating with the communication terminal 53 of a portable device, in accordance with the NFC standard. Further, the image forming apparatus 50 is equipped with the BLE communication circuit 5 (FIG. 7A, for example) which is capable of communication with the communication terminal 53 of a portable device, in accordance with the BLE (Bluetooth (registered commercial name) Low Energy) standard. The NFC circuit 4 and BLE communication circuit 5 are provided in the form of a circuit module formed on a substrate by printing, and are provided as parts of the target portion 400. In this embodiment, the NFC circuit 4 as the first communication circuit, and the BLE communication circuit 5 as the second communication circuit, are closely positioned on the target portion 400 (FIG. 8A), as will be described later in detail. That is, all that is necessary for various data to be wirelessly transmitted or received between image forming apparatus 50 (more specifically, control portion 300) and a portable device in accordance with NFC protocol or BLE communication protocol is to place the communication terminal 53 of a portable device near the target portion 400. By the way, here, in order to make the description of the wireless communication between the image forming apparatus 50 and portable device easier to understand, a case in which the NFC and BLE are used as the short distance wireless communication protocol described as an example of a short distance wireless communication. However, this embodiment is not intended to limit the present invention in terms of the short-range wireless communication protocol. That is, all that is necessary is that two protocols are different in communication range. Further, in this embodiment, the substrate on which the NFC circuit 4 was made was different from the one on which the BLE communication circuit 5 was formed. However, both the NFC circuit 4 and BLE communication circuit 5 may be on the same substrate.

In this embodiment, the target portion 400 on which the NFC circuit 4 and BLE communication circuit 5 are positioned close to each other is no less than "3 cm×5 cm" and no more than "10 cm×15 cm" in size. Thus, as long as the size of the target portion 400 falls within this range, it may be said that the NFC circuit 4 and BLE communication circuit 5 are positioned close to each other. However, in order to prevent the antenna portion of the NFC circuit 4 and the antenna portion of the BLE communication circuit 5 from being affected by the radiation of the electrical waves by the NFC circuit 4 and BLE communication circuit 5, the circuits 4 and 5 are positioned so that no less than a preset distance is provided between the antenna of the NFC circuit 4 and the antenna of the BLE communication circuit 5. The structure of the NFC circuit 4 and the structure of the BLE communication circuit 5, and the positional relationship between the NFC circuit 4 and BLE communication circuit 5 are described later.

The NFC circuit 4 and BLE communication circuit 5 are positioned on the front side of the main assembly 50a of the image forming apparatus 50 as shown in FIG. 2B. On the other hand, the control portion 300 is positioned on the rear side of the main assembly 50a of the image forming apparatus 50 as shown in FIGS. 2B and 2C. Therefore, a cable 4a, through which the NFC circuit 4 and control portion 300 have electrical connection to each other, and a cable 5a, through which the BLE communication circuit 5 and control portion 300 has electrical connection to each other, are extended within the main assembly 50a from the front side of the main assembly 50a to the rear side of the main assembly 50a, through a cable guide 1301. In this embodiment, the NFC circuit 4 and BLE communication circuit 5 are positioned close to each other. Therefore, it is easier for a service person to bind the cables 4a and 5a together, and make them snake through the main assembly 50a. That is, because the NFC circuit 4 and BLE communication circuit 5 are positioned close to each other, the image forming apparatus 50 is superior to any conventional image forming apparatus in the efficiency with which it can be assembled or maintained.

Further, the image forming apparatus 50 is provided with a Wi-Fi communication circuit 6 which enables the image forming apparatus 50 to communicating with a portable device which is capable of wirelessly communicate. Referring to FIG. 2B, the Wi-Fi communication circuit 6 is positioned on the rear side of the main assembly 50a like the control portion 300. By the way, the Wi-Fi communication circuit 6 is wider in the maximum communication range than the NFC circuit 4 and BLE communication circuit 5. Therefore, there is not problem even if it is positioned on the rear side of the main assembly 50a. Further, by positioning the Wi-Fi communication circuit 6 and control portion 300 close to each other, it is possible to reduce in length the wire which connect between the Wi-Fi communication circuit 6 and control portion 300. Therefore, it is possible to minimize the problem that the data to be transmitted or received pick up noises when the Wi-Fi communication circuit 6 and control portion 300 are connected to each other with an FFC (Flexible Flat Cable) or the like.

<Control Portion>

Figure 3:
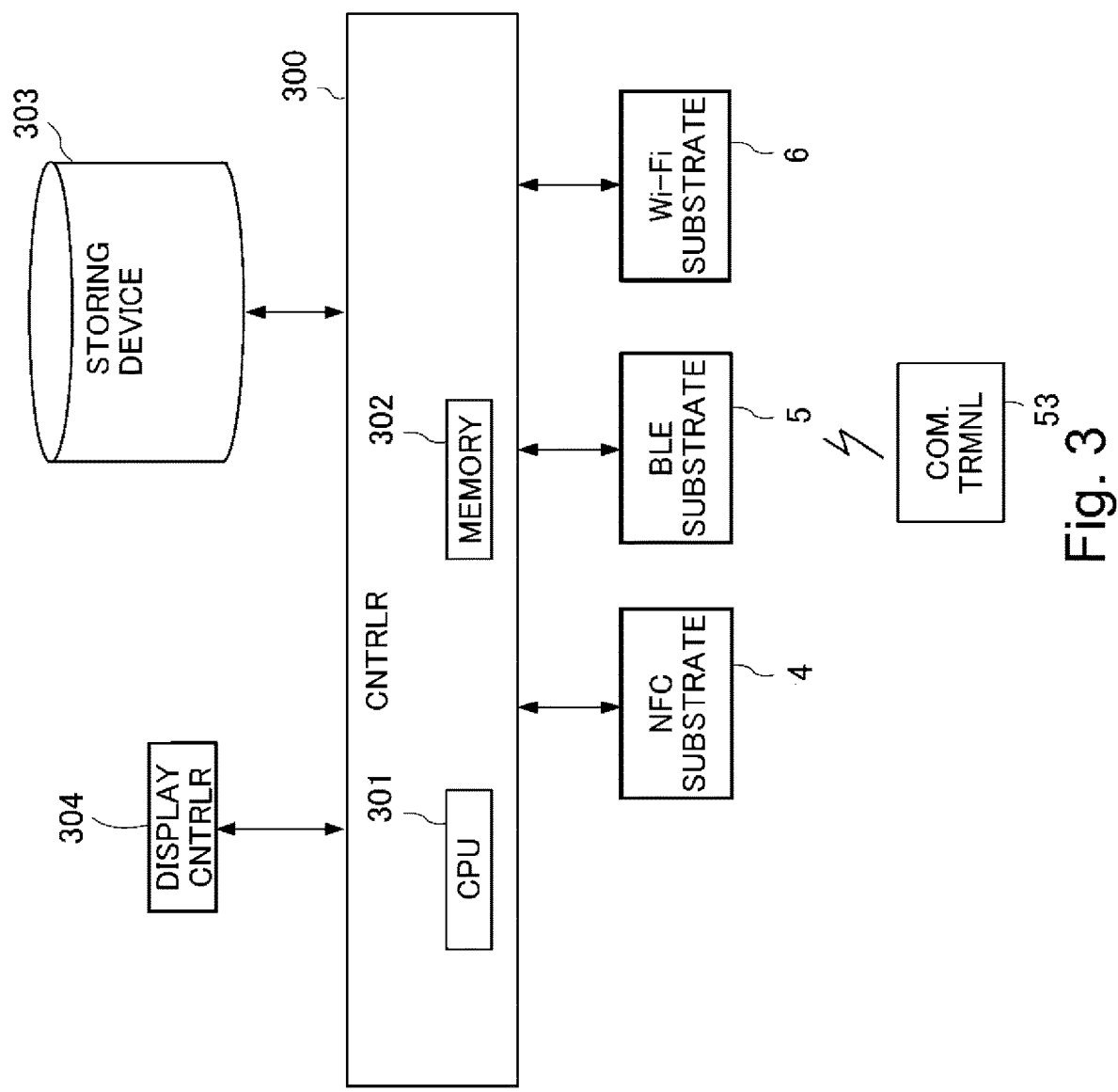
FIG. 3 is a block diagram of the control portion of the image forming apparatus shown in FIG. 1.

Referring to FIG. 1, the image forming apparatus 50 is equipped with the control portion 300 which controls the operations of the image formation unit 500. Next, referring to FIG. 1 along with FIG. 3, the control portion 300 is described. However, in addition to various portions of the image forming apparatus 50, which are illustrated in FIG. 1, various structural components of the image formation unit 500 such as the image forming portion 10, and various device such as driving force source (motor, power source, etc.) for causing these components to operate, are also in connection to the control portion 300. These portions are not essential to the present invention, and therefore, are neither illustrated nor described.

The control portion 300 which functions as a controlling means controls various operations such as data transmission and image formation. It has a CPU 301 (Central Processing Unit), and a memory 302 which comprises a ROM (Read Only Memory), a RAM (Random Access Memory), etc. It stores various programs for controlling the image forming apparatus 50, and various data such as connection setting data for pairing the image forming apparatus 50 and the communication terminal 53 of a portable device, and authentication data. For example, the control portion 300 is capable of carrying out "communication control program" and "image formation job program" (unshown). It can control the image forming apparatus 50 in operation by carrying out these programs. By the way, the memory 302 can also temporarily store the results of the computations which occur while various programs are carried out, information received from a portable device through the wireless communication terminal of the device, etc.

The control portion 300 is in connection to the storing apparatus 303, display controlling portion 304, NFC circuit 4, BLE communication circuit 5, Wi-Fi communication circuit 6, etc., by way of an input-output interface. The storing apparatus 303 can store various programs, various data, etc., like the memory 302. It is also capable of sending various programs, various data, and like to the memory 302, or receive the programs, data, and the like from the memory 302. The display control portion 304 displays various screens, soft keys, etc., on the display 510, and also, carries out various control operations such as detecting whether or not a user touched the display 510.

The NFC circuit 4 is capable of controlling the data exchange between the communication terminal 53 of a portable device and control portion 300, by establishing wireless communication (which hereafter may be referred to as NFC) between itself and communication terminal 53 of a portable device. The NFC circuit 4 can wirelessly communicate, in accordance with "ISO/IEC 18092" protocol (so-called NFC (Near Field Communication protocol). The NFC circuit 4 in this embodiment is in the form of an IC for RFID (Radio Frequency Identification, and is capable of operating as a NFC tag. Further, the NFC circuit 4 wirelessly communicates with the use of electromagnetic induction (Type-B).

The BLE communication circuit 5 is capable of wirelessly communicating with the communication terminal 53 of a portable device, following BLE protocol, In this embodiment the BLE communication circuit 5 can wirelessly communicate across a short distance, following IEEE 802.15 standard (so-called Bluetooth (registered trade mark)). More concretely, it employs BLE (Bluetooth (registered trade mark), which is a part of Bluetooth (registered trade name) 4.0, and is low in power consumption. The BLE communication circuit 5 wirelessly communicates using ISM (Industrial, Scientific, and Medical) band with, for example, 2.4 Ghz.

The Wi-Fi communication circuit 6 is capable of communicating with the communication terminal 53 of a portable device with the use of Wi-Fi, to control inputting and outputting of data between the communication terminal 53 of a portable device and control portion 300.

As wireless portable devices having a wireless communication terminal 53, a smart phone, a tablet, a laptop personal computer, a digital camera, and the like can be mentioned. As the communication terminal 53 for a portable device which a user uses, there are various ones, for example, a wireless communication terminal, which is in accordance with only BLE communication standard. The communication terminal 53 of a portable device has either a NFC circuit or a BLE communication circuit, although they are unillustrated. One of these is wirelessly connectible with one of the NFC circuit 4 and BLE communication circuit 5 of the image forming apparatus 50. That is, as described previously, in this embodiment, in order to make it possible for the communication terminal 53 of a portable device, and the image forming apparatus 50, to communicate with each other by Wi-Fi, the communication terminal 53 of a portable device and the image forming apparatus 50 have to be paired by NFC or BLE communication. In order to do so, the image forming apparatus 50 is provided with both the NFC circuit 4 and BLE communication circuit 5 to enable the image forming apparatus 50 to communicate with a portable device regardless of whether the communication terminal 53 of a portable device of the user employs NFC or BLE communication protocol. By the way, the BLE communication is narrower in communication range, and slower (1 Mbps, for example) in communication speed, than an ordinary Wi-Fi. In comparison, NFC is even narrower (roughly 10 cm, for example, in maximum communication range), and slower in communication speed (424 kbps, fore example), than an ordinary Wi-Fi. In this embodiment, BLE is limited to 20 cm in the maximum communication range, for further reduction in power consumption.

<NFC Circuit>

Figure 4:
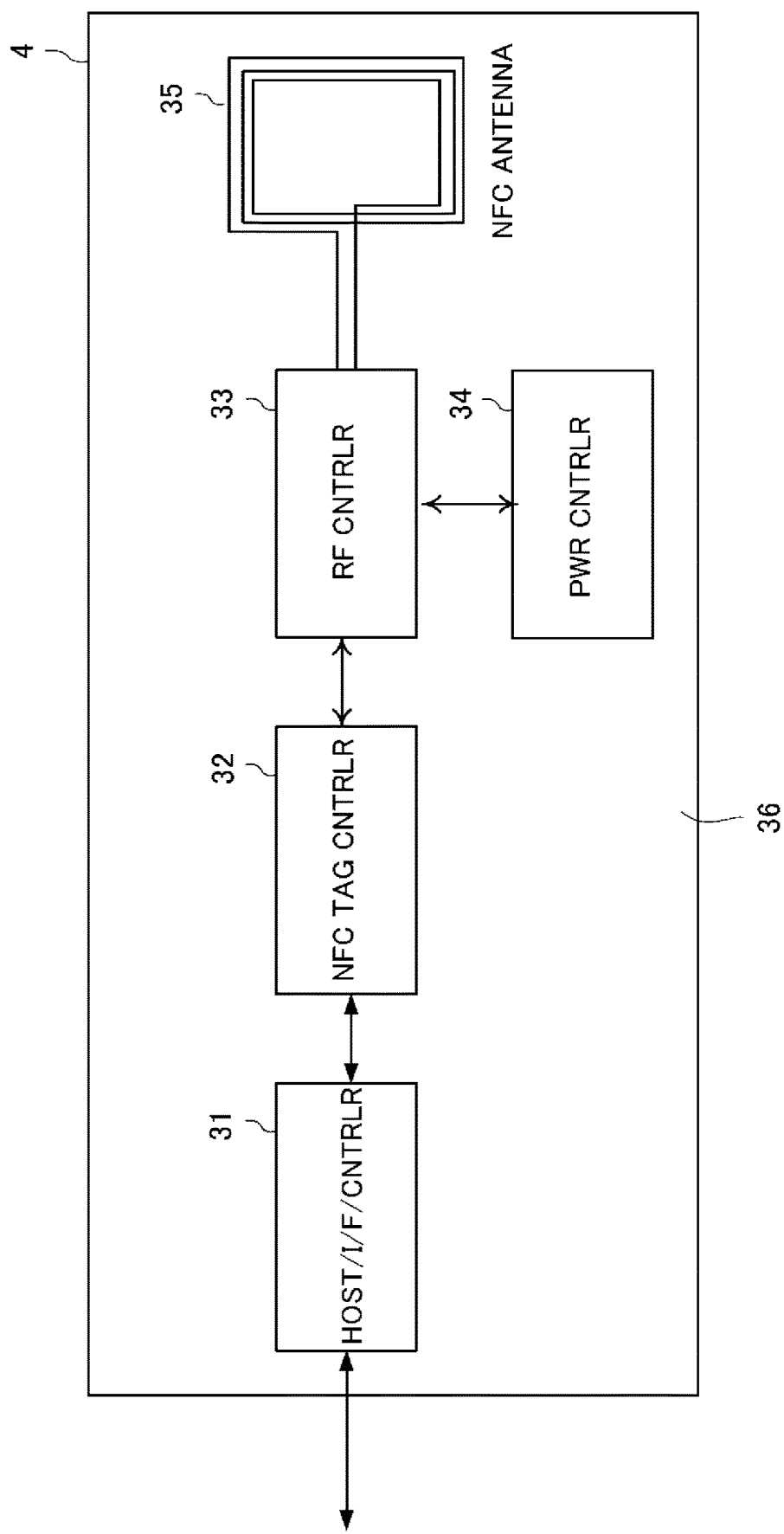
FIG. 4 is a block diagram of the NFC circuit; it shows the structure of the circuit.

Next, referring to FIGS. 4 and 5, the aforementioned NFC circuit 4 is described in structure. As shown in FIG. 4, the NFC circuit 4 has a host I/F control portion 31, a NFC tag control portion 32, a RF control portion 33, an electric power control portion 34, a NFC antenna 35, and a substrate 36 which holds the preceding portions. The host I/F control portion 31, NFC tag control portion 32, RF control portion 33, and electric power control portion 34 are integrated in the form of an IC chip.

The host I/F control portion 31 controls the inputting of data into the control portion 300 (FIG. 3), and outputting of data from the control portion 300 through a wired interface. As the interface, an interface, to which a cable 4 (FIG. 2B) such as "I2C (Inter-Integrated Circuit)" which is correspondent to a serial communication method is connectible, can be mentioned. The NFC tag control portion 32 is what processes digital signals in NFC. The NFC tag control portion 32 has a nonvolatile memory (unshown) for storing NFC tag data. The RF control portion 33 is what modulates or demodulates the electric waves for RF (Radio Frequency) when the image forming apparatus 50 is communicating with a portable device in NFC. More concretely, a wireless portable device sends or receives electric waves by being electromagnetically connected to the communication terminal 53 of a portable device by receiving the electromagnetic waves when it is communicating with the control portion 300 through NFC. The electric power control portion 34 controls the NFC circuit 4 in electric power by obtaining electromotive force by way of the NFC antenna 35, as the RF control portion 33 becomes electromagnetically connected to the communication terminal 53 of a portable device. The NFC antenna 35, which is the first antenna portion, is an antenna for the wireless communication between the control portion 300 and communication terminal 53 of a portable device. The NFC antenna 35 is for establishing the aforementioned electromagnetic connection. It is in the form of a piece of coiled wire, and is formed on the substrate 36 of the NFC circuit 4.

Figure 5A:
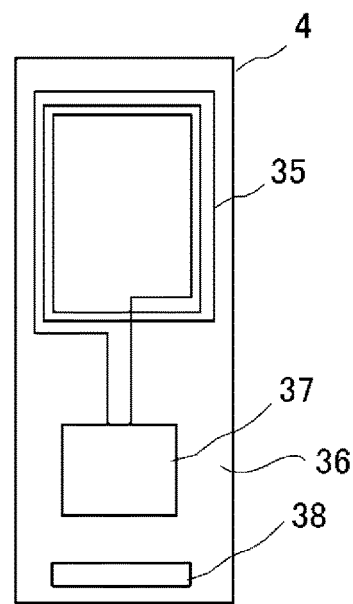
FIG. 5A is a schematic drawing of the NFC circuit.

Referring to FIG. 5A, the NFC circuit 4 is provided with the NFC antenna 35 (formed by patterning), which is on the substrate 36 of the NFC circuit 4. The IC chip 37 has NFC function. It is capable of functioning as the host I/F control portion 31, NFC tag control portion 32, RF control portion 33, and electric power control portion 34 (FIG. 4) as described above. Further, the NFC circuit 4 is provided with a connector 38 which is connectible with the cable 4a (FIG. 2B) for connecting itself with the control portion 300 by way of an interface. The connector 38 is on the substrate 36 of the NFC circuit 4.

Figure 5B:
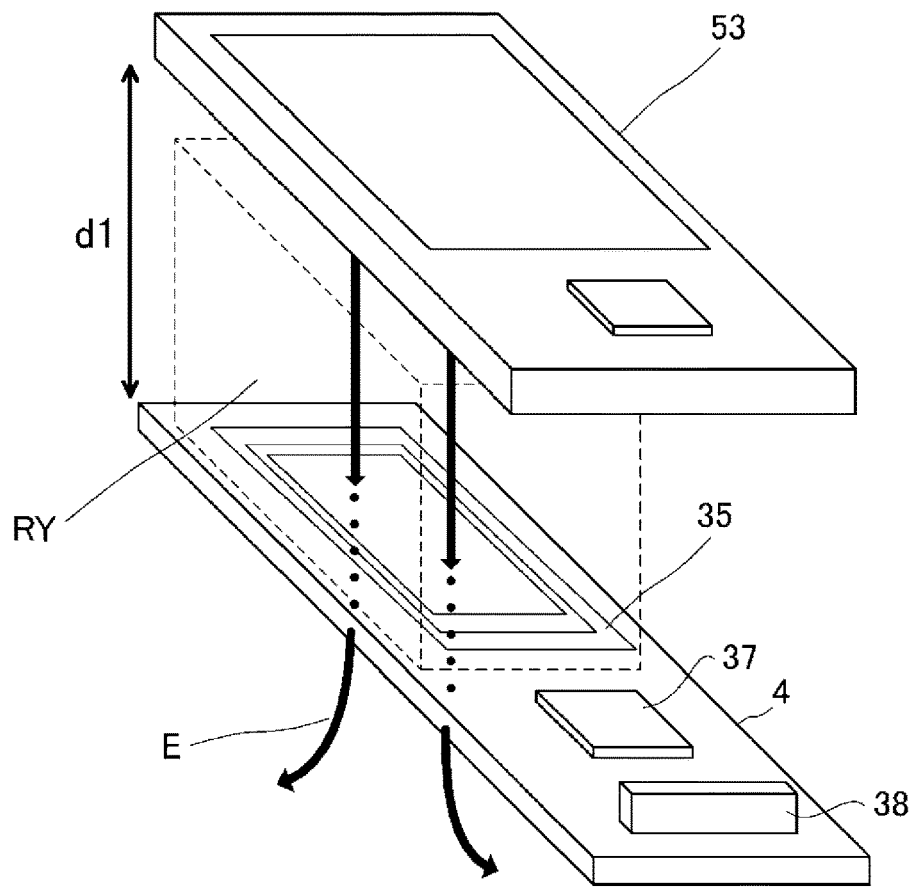
FIG. 5B is a drawing for describing NFC.

Referring to FIG. 5B, the placement of the communication terminal 53 of a portable device in the proximity of the NFC circuit 4 by a user makes it possible for the NFC circuit 4 to wirelessly communicate with the portable device. That is, as the communication terminal 53 of a portable device is placed close to the NFC circuit 4 by a user, the electromagnetic waves which generate from the communication terminal 53 of a portable device penetrates the NFC antenna 35 of the NFC circuit 4. As the electromagnetic waves penetrate the NFC antenna 35, the electric force induced in the NFC antenna 35, which is in the form of a coil, by electromagnetic connection, is controlled by the electric power control portion 34, whereby the NFC tag control portion 32 and RF control portion 33 are made to operate. Therefore, communication is established between the image forming apparatus 50 and portable device (FIG. 4). Therefore, the communication range between the communication terminal 53 of a portable device and NFC circuit 4 is equal to the size of the area which is vertically above the NFC antenna 35. Further, the maximum communication range between the communication terminal 53 of a portable device and NFC circuit 4 is limited to such a distance (10 cm, for example) in which the communication terminal 53 of a portable device is electromagnetically connectible to the NFC circuit 4. By the way, in FIG. 5B, only the top side of the communication range of the NFC circuit 4, to which the communication terminal 53 of a portable device is placed close, is shown, in order to make it easier to understand the description of this setup; the communication range of the communication terminal 53 of a portable device, on the bottom side of the communication terminal 53 of a portable device is not taken into consideration.

<BLE Communication Circuit>

Figure 6:
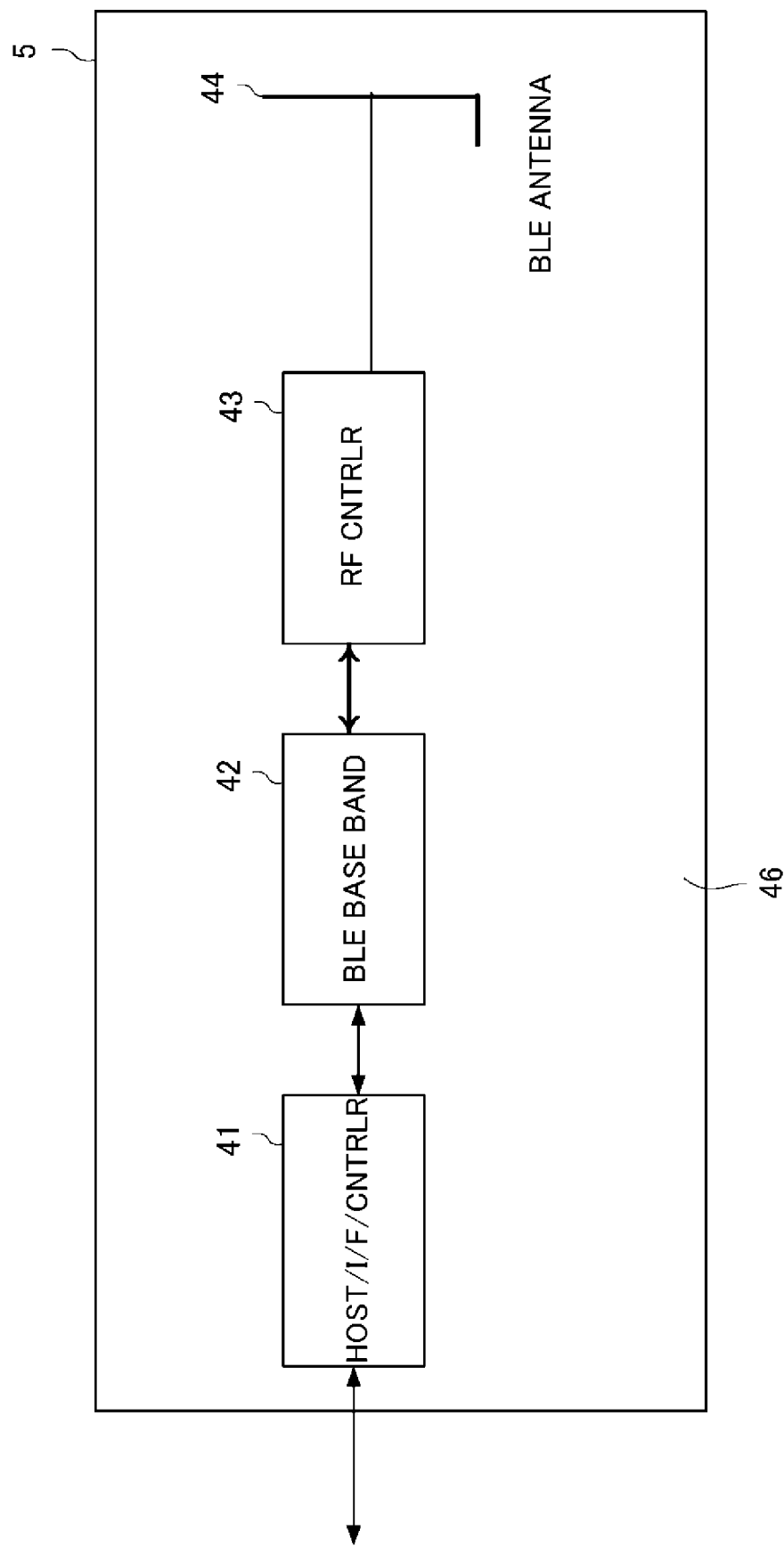
FIG. 6 is a block diagram of a BLE communication circuit; it shows the structure of the circuit.
Figure 7A:
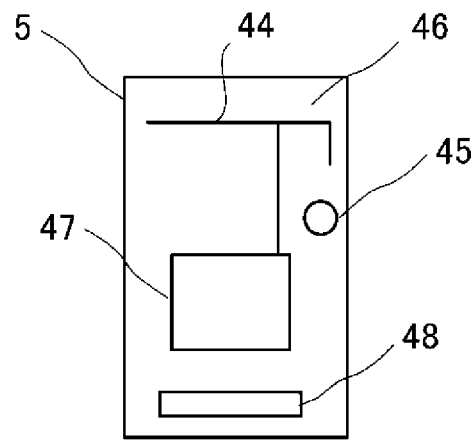
FIG. 7A is a schematic drawing of the BLE communication circuit.
Figure 7B:
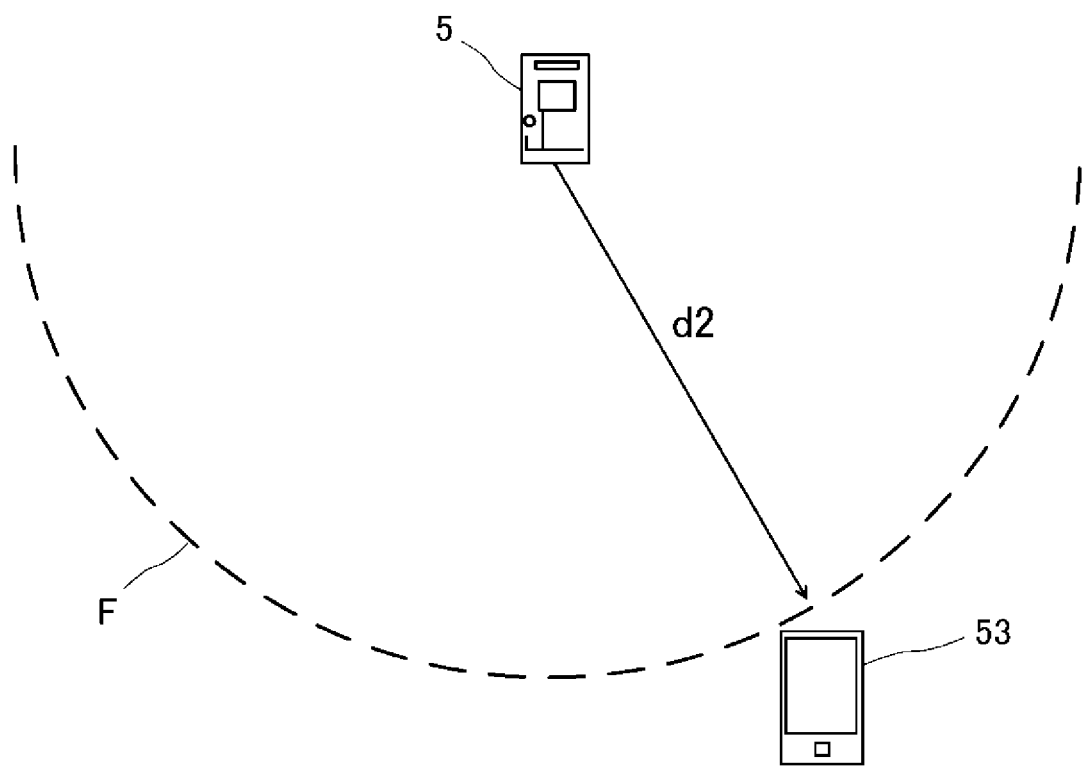
FIG. 7B is a drawing for describing the BLE communication.

Next, referring to FIGS. 6 and 7B, the aforementioned BLE communication circuit 5 is described about its structure. Referring to FIG. 6, the BLE communication circuit 5 is provided with a host I/F control portion 41, a BLE base band portion 42, a RF control portion 43, a BLE antenna portion 44, and a substrate 46 on which the preceding portions are held. The host I/F control portion 41, base band portion 42, and RF control portion 43 are parts of an IC chip, which can function as any of them.

The host I/F control portion 41 controls the inputting of data into the control portion 300 (FIG. 3), and outputting of data from the control portion 300, through a wired interface. As the interface, an interface, to which a cable (FIG. 2B) such as a cable 5 (FIG. 2B) which is compatible with a serial communication means such as "USB (Universal Serial Bus)" is connectible can be listed. The base band portion 42 is what processes base band signals to process the digital signals sent via BLE. The RF control portion 43 is what modulates or demodulates the electric waves for RF (Radio Frequency) when the image forming apparatus 50 is communicating with a portable device in Bluetooth. The BLE antenna portion 44, which is the second antenna, is for enabling the image forming apparatus 50 to wirelessly communicate with the communication terminal 53 of a portable device. The BLE antenna portion 44 is in the form of a preset pattern, and is formed on the substrate 46 of the BLE communication circuit 5.

Referring to FIG. 7A, the BLE communication circuit 5 is provided with the BLE antenna portion 44 (formed by patterning), which is on the substrate 46 of the BLE communication circuit 5. The IC chip 47 has BEL communication function. It is capable of functioning as the host I/F control portion 41, base band portion 42, RF control portion 43 (FIG. 6) as described above. Further, the BLE communication circuit 5 is provided with a connector 48 which is connectible with the cable 5a (FIG. 2B) for connecting itself with the control portion 300 by way of an interface. The connector 48 is on the substrate 46 of the BLE communication circuit 5.

The BLE communication circuit 5 communicates in BLE by the widely used position control which uses a BLE beacon. That is, the BLE communication circuit 5 always transmits beacon electric waves. As the communication terminal 53 of a portable device catches these beacon waves, it asks the BLE communication circuit 5 for communication, and begins two way communication. Referring to FIG. 7B, the beacon electric waves transmitted from the BLE communication circuit 5 uniformly radiate across the front side of the main assembly 50a (FIG. 1). The semicircular area (maximum communication range) in FIG. 7B, which is d2 in radius is roughly uniform in electric wave strength. Thus, as the strength of the beacon electric waves measured by the communication terminal 53 of a portable device becomes equal to a value which is equivalent to distance d2, the control portion 300 requests starting of BLE communication. That is, as the distance from the communication terminal 53 of a portable device to the BLE communication circuit 5 becomes no more than distance d2, BLE communication is initiated. In this embodiment, distance d2 is limited to 20 cm. By the way, for the ease of understanding, the description given above, (in order to make the description given above easier to understand), FIG. 7B shows only the front side of the target portion 400 (FIG. 1), close to which the communication terminal 53 of a portable device is placed.

By the way, as described above, NFC is such a communication technology that utilizes electromagnetic connection between two parties, and is established by the reception of the electric waves irradiated by one party, or the other party. Thus, placement of the BLE communication circuit 5 near the NFC circuit 4 by a user makes it possible for the communication terminal 53 of a portable device and NFC circuit 4 to wirelessly communicate with each other. Further, in this embodiment, also in BLE communication, placement of communication terminal 53 of a portable device near the BLE communication circuit 5 by a user makes it possible for the communication terminal 53 of a portable device and BLE communication circuit 5 to wirelessly communicate with each other. As described above, in this embodiment, regardless of whether the wireless communication between the image forming apparatus 50 and portable device is to be done in NFC or BLE method, placement of the communication terminal 53 of a portable device near the image forming apparatus 50 by a user makes it possible for the communication terminal 53 of a portable device and image forming apparatus 50 to wirelessly communicate with each other in accordance with the preset communication standard.

As described above, in this embodiment, the communication terminal 53 of a portable device, and image forming apparatus 50, are set up so that various data such as image data are transmitted from the communication terminal 53 of a portable device to the image forming apparatus 50 by Wi-Fi communication method after the pairing of the communication terminal 53 of a portable device and image forming apparatus 50 by NFC method or BLE communication method. In a case where both NFC method and BLE communication method are employed, if the area of the main assembly 50a, where the NFC circuit 4 is positioned, is apart from the area of the main assembly 50a, where the BLE communication circuit 5 is positioned, it is difficult for a user to find where a user is to positioned the communication terminal 53 of a portable device, in order to place the communication terminal 53 of a portable device near the NFC circuit 4 and/or BLE communication circuit 5. In this embodiment, therefore, the NFC circuit 4 and BLE communication circuit 5 are positioned close to each other. Therefore, only one target portion 400 (FIG. 1) is needed for a user to place the communication terminal 53 of a portable device, close to the control portion 300. Therefore, a user can place the communication terminal 53 of a portable device close to the control portion 300 with no confusion. More specifically, the NFC antenna 35 and BLE antenna portion 44 are positioned on the inward side of the target portion 400 (FIG. 1) of the main assembly 50a so that as the communication terminal 53 of a portable device is placed close to the target portion 400, wireless communication is established between the portable device and image forming apparatus 50. However, if the NFC circuit 4 and BLE communication circuit 5 are placed too close to each other, it is possible that they will interfere with each other in the state of communication, and therefore, it will become impossible for the communication terminal 53 of a portable device and image forming apparatus 50 to properly communicate with each other.

In this embodiment, therefore, the NFC circuit 4 and BLE communication circuit 5 are positioned apart from each other by no less than a preset distance, even though they are positioned within the range of the target portion 400. Next, referring to FIGS. 8A and 9 along with FIG. 1, the positioning of the NFC circuit 4 and BLE communication circuit 5 in this embodiment is described.

Figure 8A:
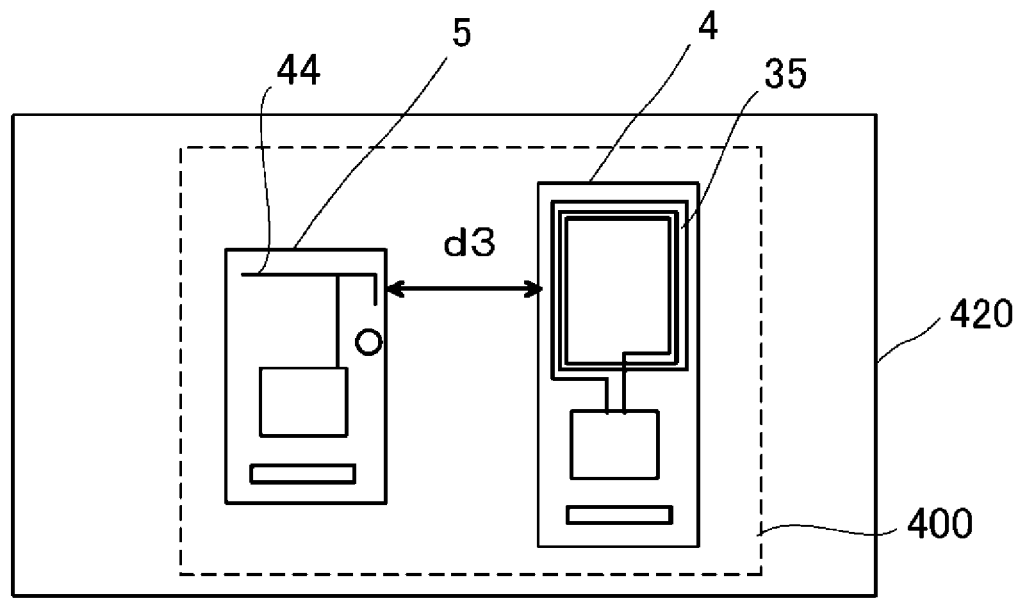
FIG. 8A is a front view of a combination of the NFC circuit and BLE communication circuit.
Figure 8B:
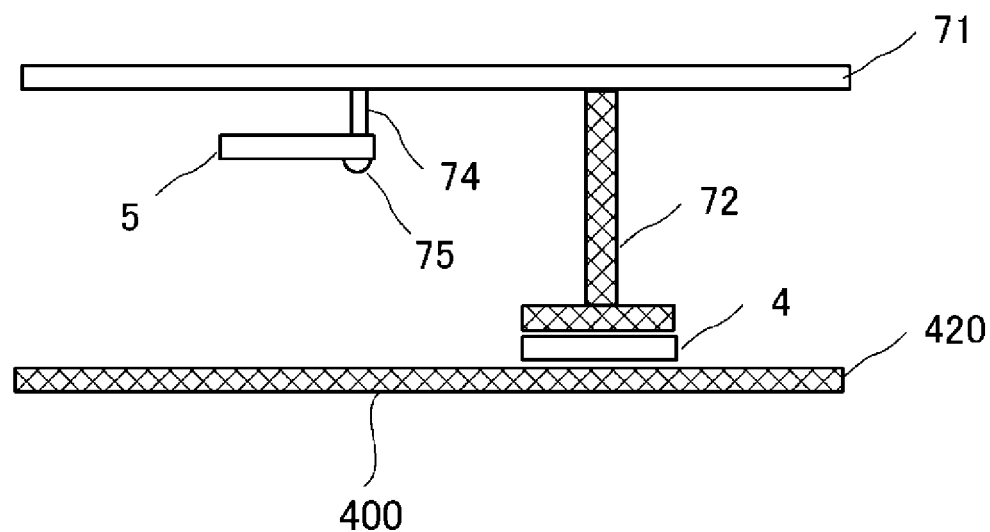
FIG. 8B is a top view of the combination of the NFC circuit and BLE communication circuits.

As described above, both the NFC circuit 4 and BLE communication circuit 5 are circuit modules for wireless communication based on electric waves. They are supported by the metallic frame (metallic plate 71, which will be described later) which supports various units such as the image formation unit 500, and control portion 55, within the main assembly 50a. Generally speaking, in the case of the circuit module for wireless communication based on electric waves, the electrically conductive objects, such as antennas, wiring, and electronic components, interfere with electric waves, possibly affecting the radiation of electric waves. In particular, the antennas are essential in the transmission and reception of electric waves. Therefore, the antennas are desired to be disposed in a position in which there is no interference from the electric waves from the other circuit module. In this embodiment, therefore, the NFC circuit 4 and BLE communication circuit 5 are positioned no less than a preset distance apart from each other, within the range of the target portion 400, as shown in FIGS. 8A and 8B. More concretely, it is desired that the NFC antenna 35 and BLE antenna portion 44 are positioned no less than 10 mm-20 mm, preferably no less than 15 mm, apart from each other (distance d3 in drawings). If the BLE antenna portion 44 is positioned so that the linear distance between the BLE antenna portion 44 and target portion 400 is no more than 60 mm, it is easier for the image forming apparatus 50 to wirelessly communicate with the communication terminal 53 of a portable device, the communication terminal 53 of which is in the adjacencies of the target portion 400.

The NFC circuit 4 wirelessly communicates with the communication terminal 53 of a portable device via electromagnetic connection. Therefore, from the standpoint of improving the NFC circuit 4 in reception sensitivity, it is desired that the image forming apparatus 50 is structured so that the electromagnetic waves emitted from the communication terminal 53 of a portable device penetrate the NFC antenna 35 of the NFC circuit 4 as much as possible. Thus, the NFC circuit 4 is desired to be positioned so that its directly faces the external cover 420 in such an attitude that its NFC antenna 35 directly faces the target portion 400.

Figure 9:
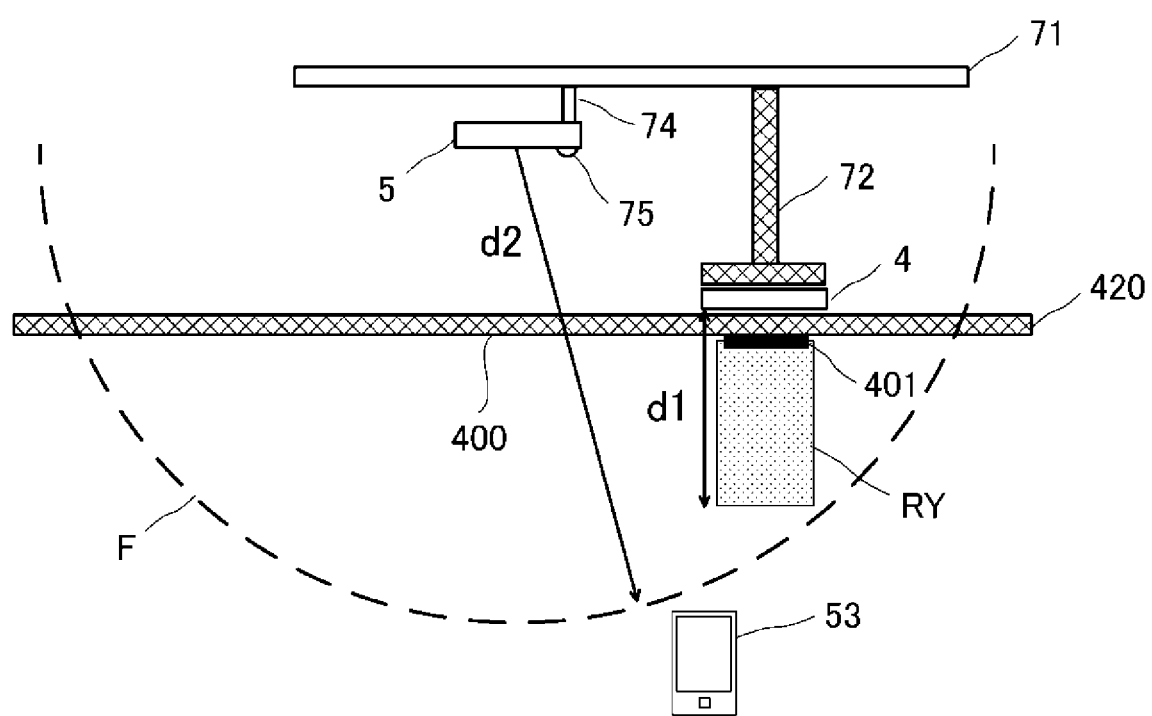
FIG. 9 is a drawing for describing the positioning of the NFC circuit and BLE communication circuit.

Next, referring to FIG. 9, in this embodiment, the range in which the NFC circuit 4 and communication terminal 53 of a portable device can wirelessly communicate with each other, is limited to distance d1 (10 mm, for example) within which electromagnetic connection is possible between the circuit 4 and terminal 53. Therefore, it is better that the NFC circuit 4 is placed close to the external cover 420 so that placement of the communication terminal 53 of a portable device in the adjacencies of the mark 401 of the target portion 400 of the external cover 420 makes it possible for the image forming apparatus 50 and portable device to wirelessly communicate with each other. In this embodiment, a supportive member 72 molded of electrically nonconductive plastic is attached to the metallic plate 71 in such a manner that it extends toward the external cover 420, and the NFC circuit 4 is attached to the supportive member 72, being thereby placed close to the external cover 420. By the way, the NFC circuit 4 may be directly attached to the rear surface of the external cover 420 instead of using the supportive member 72.

Referring to FIG. 8B, the control portion 300 is provided with the metallic plate 71, which is placed on the inward side of the outward surface of the target portion 400 of the external cover 420, with the presence of a preset distance between itself and the target portion 400 (that is, external cover 420). The metallic plate 71 is a part of the supportive frame which supports the internal units such as the image formation unit 500, in the main assembly 50a. The external cover 420 is fixed to the metallic plate 71. In this embodiment, the metallic plate 71 is made of metal to ground components such as an electric power source, in the main assembly 50a (FIG. 1). It is this metallic plate 71 that the aforementioned molded supportive member 72 is attached to in such a manner that it extends toward the external cover 420.

Generally speaking, a wireless communication module such as the BLE communication circuit 5 which uses high frequency band (2.4 gHz, for example) functions best in terms of antenna properties, when it is properly grounded. In this embodiment, the substrate 46 of the BLE communication circuit 5 is provided with a screw hole 45 for an electrically conductive small screw. Further, the control portion 300 is provided with an electrically conductive metallic spacer 74 for attaching the BLE communication circuit 5 to the metallic plate 71. The spring anchoring shaft 74 is attached to the metallic plate 71 in such a manner that it extends from the metallic plate 71 toward the external cover 420. The metallic spacer 74 is shorter than the molded plastic member 72. It is this metallic spacer 74 that the BLE communication circuit 5 is fixed to with the use of a small metallic screw 75 put through the screw hole 45. This is how the BLE communication circuit 5 is grounded through the screw hole 45, metallic spacer 74, and small screw 75. That is, the metallic spacer 74 is a spacing member for properly positioning the BLE communication circuit 5, and also, an electrically conductive member for allowing electricity to freely flow between the metallic plate 71 and BLE communication circuit 5. Further, the positioning of the BLE communication circuit 5 close to the metallic plate 71 makes it possible to prevent the electric waves from the BLE communication circuit 5 from reaching the rear side (opposite side from side to which BLE communication circuit 5 is attached). By the way, it is desired that the BLE communication circuit 5 and NFC circuit 4 are positioned so that the thickness direction of the former is parallel to that of the latter.

Referring to FIG. 9, the range in which the communication terminal 53 of a portable device and NFC circuit 4 can wirelessly communicate with each other is limited to an area RY (cross-hatched with dotted lines), and, to the distance d1 (10 cm, for example). However, the communication range in which the communication terminal 53 of a portable device and BLE communication circuit 5 are capable of wirelessly communicating with each other is limited to an area F, and, to distance d2 (20 cm). This area F is the semicircular area, the radius of which from the center of the BLE communication circuit 5 is d2. In this embodiment, the BLE communication circuit 5 and NFC circuit 4 are positioned close to each other so that the maximum communication range (distance d2) of the BLE communication circuit 5 includes the maximum communication range (distance d1) of the NFC circuit 4. The distance d2 is set to the smallest value which allows the maximum communication range of the BLE communication circuit 5 includes the maximum communication range of the NFC circuit 4. Thus the area RY, in which the NFC circuit 4 makes it possible for a portable device and the image forming apparatus 50 to wirelessly communicate (NFC) each other, is also an area in which the image forming apparatus 50 can wirelessly communicate with a portable device with the use of the BLE communication circuit 5 (BLE communication). In this embodiment, therefore, the mark 401 is placed on the area RY of the external cover 420. Thus, a user can make a portable device wirelessly communicate with the image forming apparatus 50 by way of BLE communication circuit 5 or NFC circuit 4, by placing the communication terminal 53 of a portable device close to the mark 401.

As described above, in this embodiment, the NFC circuit 4 and BLE communication circuit 5 are positioned close to the mark 401 of the target portion 400. That is, the image forming apparatus 50 is provided with only one portion, that is, the target portion 400, close to which a user is to place the communication terminal 53 of a portable device close. Thus, as the communication terminal 53 of a portable device is placed close to the target portion 400, wireless communication is established between the image forming apparatus 50 and portable device by the NFC circuit 4 and BLE communication circuit 5. That is, all that has to be done by a user to make the image forming apparatus 50 and the communication terminal 53 of a portable device wirelessly communicate with each other is to place the communication terminal 53 of a portable device close to the target portion 400. That is, this embodiment can make the image forming apparatus 50 and portable device simpler in operation, and therefore, superior in usability, than any combination of a conventional image forming apparatus and a conventional portable device. For example, simple placement of the communication terminal 53 of a portable device close to the target portion 400, causes the image forming apparatus 50 to be paired with the portable device to send image data to be sent from the communication terminal 53 of a portable device to the image forming apparatus 50 so that an image forming operation can be started based on the image data.

<Others>

Figure 10A:
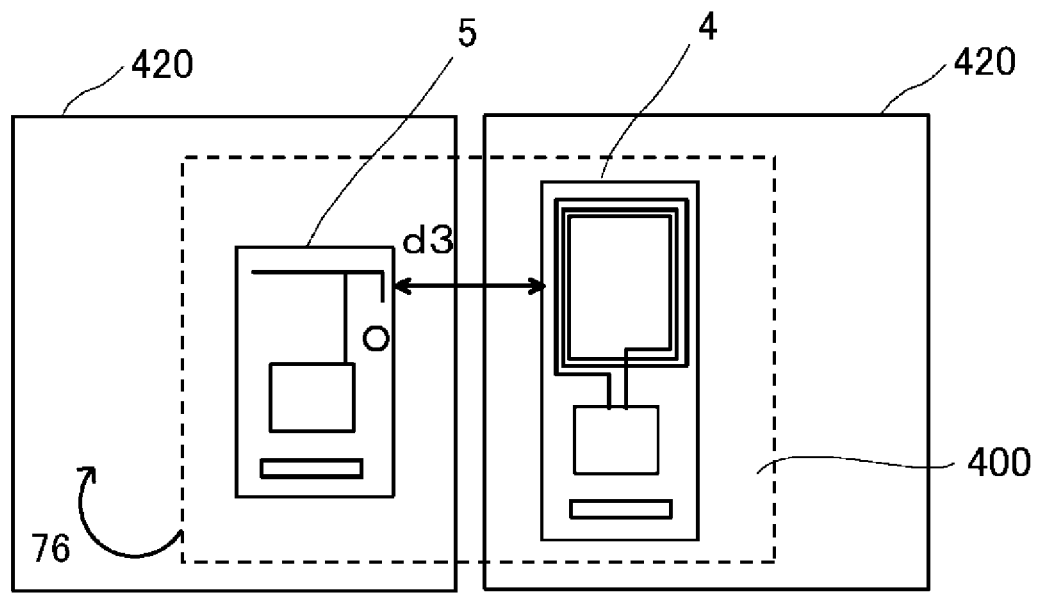
FIG. 10A is a front view of the combination of the NFC circuit and BLE communication circuit in a case where the wirelessly communicating means of the image forming apparatus is provided with two external covers and two metallic plates.
Figure 10B:
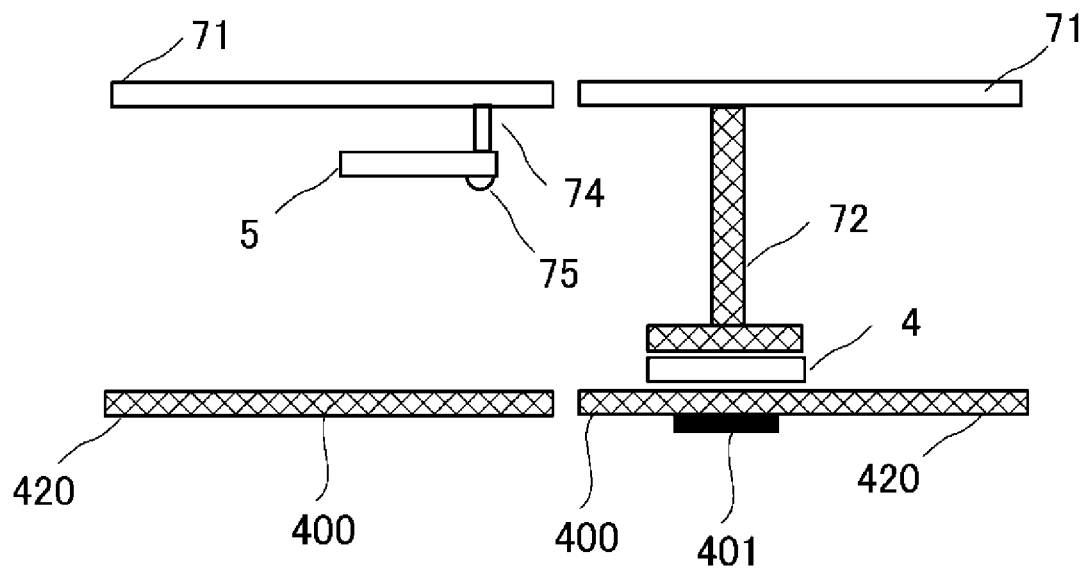
FIG. 10B is a top view of the combination of the NFC circuit and BLE communication circuit in a case where the wireless communicating means of the image forming apparatus is provided with two external cover and two metallic plate.

By the way, referring to FIGS. 10A and 10B, the metallic plate 71 may comprise two separate sections, that is, a section to which the NFC circuit 4 is fixed with the use of the molded plastic member 72, and a section to which the BLE communication circuit 5 is fixed with the use of the metallic spacer 74. Further, the external cover 420 may comprise two separate portions, like the two-piece metallic plate 71. That is, the NFC circuit 4 and BLE communication circuit 5 may be placed on two separate metallic plates 71, one for one, and be covered with two separate external covers 420, one for one. In such a case, the target portion 400 is formed so that it extends across both the two external covers 420. Structuring the image forming apparatus 50 so that the NFC circuit 4 and BLE communication circuit 5 are attached two metallic plates 71, one for one, and are covered with two external covers 420, one for one makes it easier for a user to adjust the BLE communication circuit 5, in the distance d3 between the NFC antenna 35 and BLE antenna portion 44, on the target portion 400.

Figure 11A:
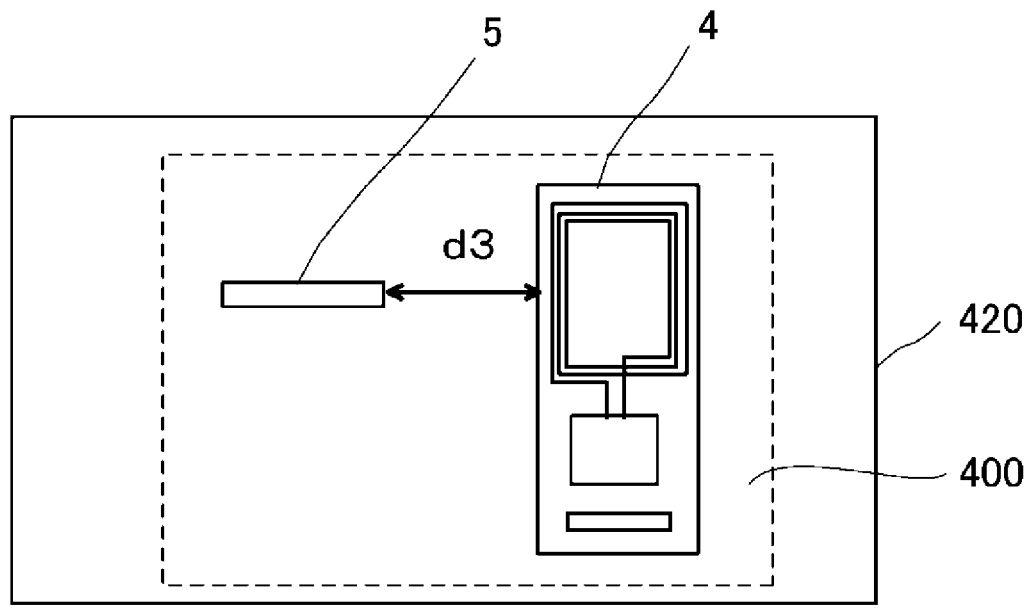
FIG. 11A is a front view of the combination of the NFC circuit and BLE communication circuit, which is different in the positioning of the NFC circuit and BLE communication circuit relative to each other, from the one in 10A.
Figure 11B:
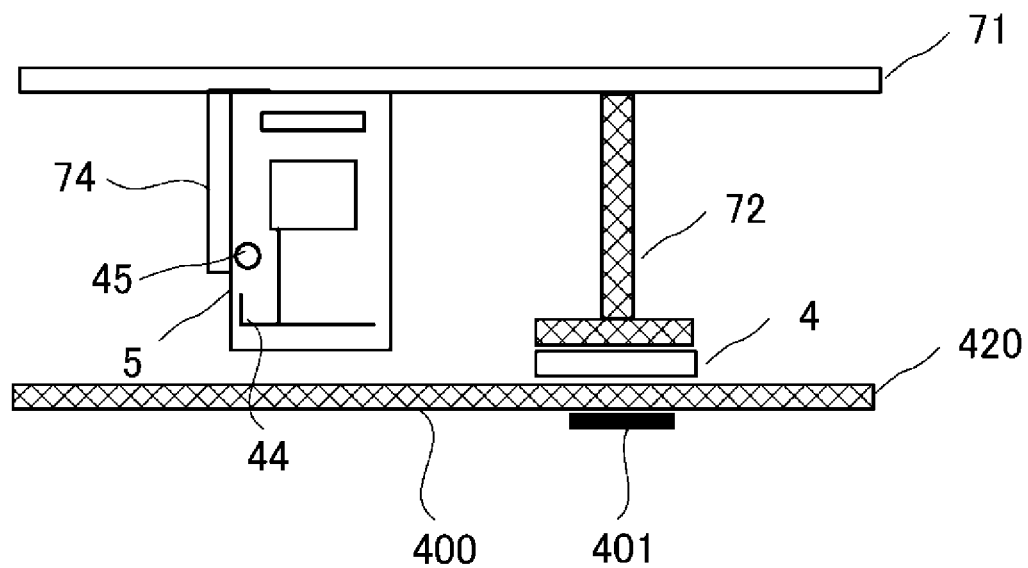
FIG. 11B is a top view of the combination of the NFC circuit and BLE communication circuit, which is different in the positioning of the NFC circuit and BLE communication circuit relative to each other, from the one in FIG. 10B.

By the way, it is not mandatory that the BLE communication circuit 5 and NFC circuit 4 are position in such a manner that the thickness direction of the BLE communication circuit 5 is parallel to that of the NFC circuit 4. Referring to FIGS. 11A and 11B, the BLE communication circuit 5 and NFC circuit 4 may be positioned so that the thickness direction of the former is intersectional to that of the latter. That is, in the case of the BLE communication, for example, communication is established by the radiation of the electric waves from the BLE antenna portion 44 of the BLE communication circuit 5. Therefore, there is no restriction regarding the positioning of the BLE antenna portion 44 relative to the external cover 420. Therefore, as long as it is assured that the distance d3 is provided between the NFC antenna 35 and BLE antenna portion 44, the NFC circuit 4 and BLE communication circuit 5 may be angled relative to the external cover 420.

Figure 12A:
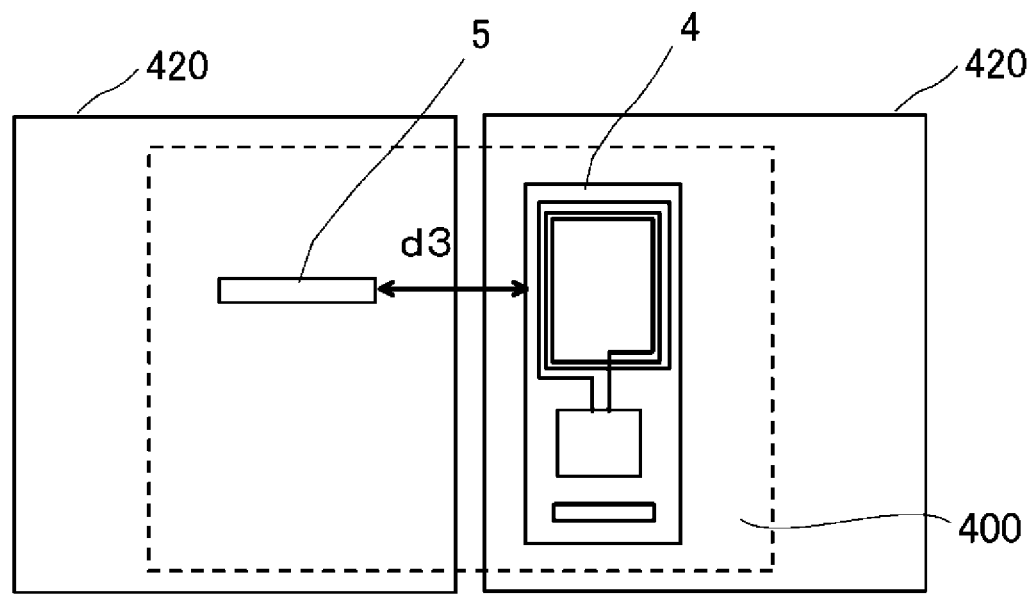
FIG. 12A is a front view of a combination of the NFC circuit and BLE communication circuit, in a case where the wireless communicating means of the image forming apparatus is provided with two external cover, and two metallic plates, and which is different in the positioning of the combination of the NFC circuit and BLE communication circuit relative to each other, from the one in FIG. 10B.
Figure 12B:
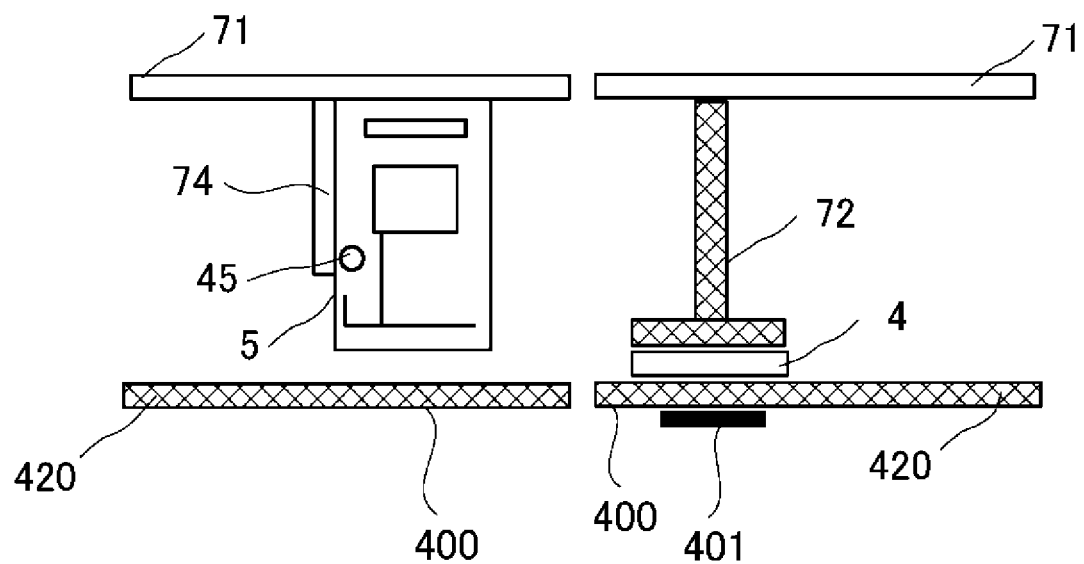
FIG. 12B is a top view of the combination of the NFC circuit and BLE communication circuit, in a case where the wireless communicating means of the image forming apparatus is provided with two external covers and two metallic plates, and is separate from the metallic plate, and which is different in the positioning of the NFC circuit and BLE communication circuit relative to each other, from those one shown in FIGS. 10 and 11.

Further, it is desired that even if the BLE communication circuit 5 and NFC circuit 4 are positioned in such a manner that the thickness direction of the former is not parallel to that of the latter, a user can adjust the control portion 300 in the distance between the NFC antenna portion 35 and BLE antenna portion 44, on the target portion 400. Thus, even in such a case, the control portion 300 may be structured so that the NFC circuit 4 and BLE communication circuit 5 are attached to two separate metallic plates 71, one for one, and covered with two separate external covers 420, one for one, as shown in FIGS. 12A and 12B.

Figure 13:
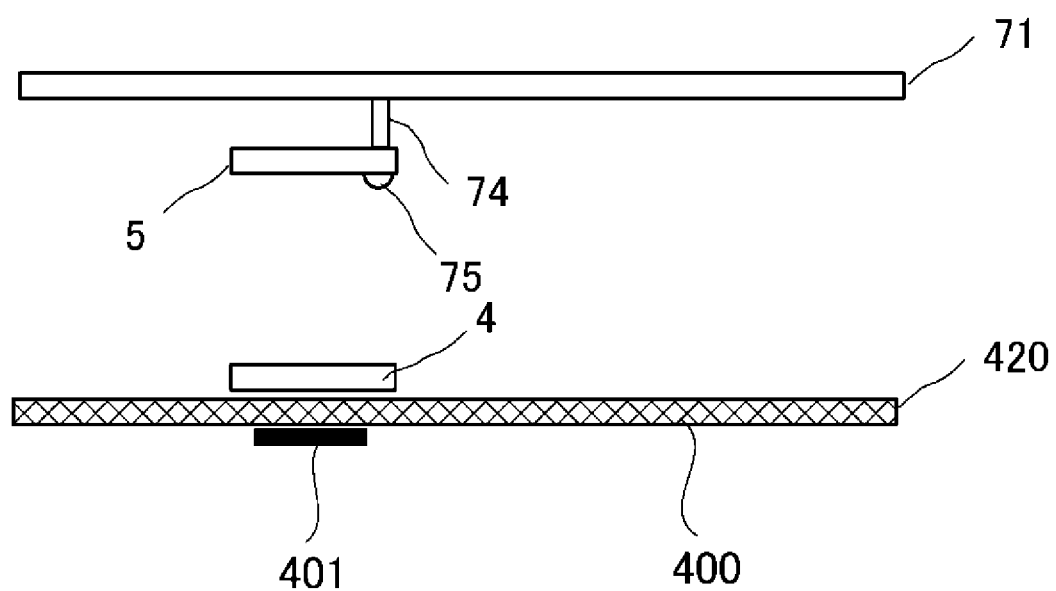
FIG. 13 is a top view of the combination of the NFC circuit and BLE communication circuit, which is different in the position of the circuits relative to each other, from those shown in FIGS. 10 and 11.

Further, referring to FIG. 13, regarding the target portion 400, the NFC circuit 4 and BLE communication circuit 5 may be positioned so that they, and the surface (side to which communication terminal of portable device is placed close) overlap in terms of the direction perpendicular to the surface of the target portion 400. In such a case, it is possible for a user to adjust the control portion 300 in the distance d3 by changing the metallic spacer 74 in length.

By the way, in the description the embodiment of the present invention given above, the communication terminals of a smart phone, a tablet, a notebook personal computer, a digital camera, etc., are listed as examples the communication terminal 53 of a portable device. However, the present invention is also applicable to any device as long as the device is provided with short distance wireless communication capability such as NFC and BLE communication. For example, the present invention is also applicable to an IC card, for example. Even in the case of such a device, a user can make the image forming apparatus 50 and a portable device wirelessly communicate each other, simply by placing the communication terminal of a portable device, or IC card close to the mark 401, regardless of the wireless communication method employed the image forming apparatus 50 and portable device. That is, the present invention can improve an image forming apparatus such as the image forming apparatus 50 in usability.

The present invention can easily improve, in usability, an image forming apparatus which is enabled to wirelessly communicate with a portable communication device, based on one of two or more wireless communication standards, as the communication terminal of the portable device is placed close to the main assembly of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-107295 filed on Jun. 7, 2019 and 2020-095578 filed on Jun. 1, 2020, which are hereby incorporated by reference herein in their entirety.

What is claimed is:

1. An image forming apparatus comprising:
   an operating unit including a display portion and configured to be operated by a user;
   an image forming unit configured to form an image on a recording material;
   a first antenna portion communicable with a mobile communication terminal, said first antenna portion being provided below said operating unit with respect to a vertical direction;
   a second antenna portion communicable with a mobile communication terminal including a communicable range broader than that of said first antenna portion, said second antenna portion being provided below said operating unit;
   an outer cover provided below said operating unit, surrounding said first antenna portion and said second antenna portion and constituting at least a part of an outer casing of said image forming apparatus; and
   a target portion provided on said outer cover and configured to function as a mark to which the mobile communication terminal is to be approached,
   wherein the communicable range of said first antenna portion is within the communicable range of said second antenna portion.

2. An image forming apparatus according to claim 1, wherein said first antenna portion is disposed on a side of said target closer to a surface to which the mobile communication terminal is to be approached.

3. An image forming apparatus according to claim 1, wherein said first antenna portion and said second antenna portion are apart from each other by 15 mm or more.

4. An image forming apparatus according to claim 1, wherein said first antenna portion has a maximum communicable range of 10 cm, and said second antenna portion has a maximum communicable range of 20 CM.

5. An image forming apparatus according to claim 1, further comprising a substrate provided with said first antenna portion and said second antenna portion.

6. An image forming apparatus according to claim 1, further comprising a first communication substrate provided with said first antenna portion, and a second communication substrate provided with a second antenna portion.

7. An image forming apparatus according to claim 6, further comprising a supporting frame of metal supporting said image forming unit, wherein said first communication substrate and said second communication substrate are supported on said frame.

8. An image forming apparatus according to claim 6, wherein said first communication substrate and said second communication substrate have a common thickness direction.

9. An image forming apparatus according to claim 6, wherein said first communication substrate and said second communication substrate are disposed such that they are overlapped as viewed in a thickness direction of said substrates.

10. An image forming apparatus according to claim 6, wherein said third antenna is capable of receiving an image data from said mobile communication terminal via Wi-Fi,
    wherein said image forming unit is capable of forming the image on the recording material based on the image data received through said third antenna, and
    wherein said first antenna and said second antenna are capable of communicating a setting data for establishing Wi-Fi between themselves and said third antenna.

11. An image forming apparatus according to claim 1, wherein said first antenna portion is communicable according to NFC which is a short-range wireless communication standard, and said second antenna portion is communicable according to BLE which is a short-range wireless communication standard.

12. An image forming apparatus according to claim 1, wherein said target is provided with the mark indicating a position to which the mobile communication terminal is to be approached.

13. An image forming apparatus according to claim 1, further comprising a controller provided on a rear side of said image forming apparatus and configured to control communication by said first antenna portion and said second antenna portion,
    wherein said controller is connected to said first antenna portion and said second antenna portion.

14. An image forming apparatus according to claim 1, further comprising a third antenna communicable with a mobile communication terminal according to Wi-Fi,
    wherein said third antenna is provided on a rear side of said image forming apparatus.

15. An image forming apparatus according to claim 1, further comprising
a first communication substrate provided with said first antenna portion;
a second communication substrate provided with a second antenna portion; and
a supporting frame of metal supporting said image forming unit, wherein said first communication substrate and said second communication substrate are supported on said frame.

16. An image forming apparatus according to claim 15, wherein said first communication substrate and said second communication substrate have a common thickness direction.

17. An image forming apparatus according to claim 1, wherein said first antenna portion is disposed on a side of said target closer to a surface to which the mobile communication terminal is to be approached.

18. An image forming apparatus comprising:
an operating unit including a display portion and configured to be operated by a user;
an image forming unit configured to form an image on a recording material based on an image data;
a first antenna portion communicable with a mobile communication terminal, said first antenna portion being provided below said operating unit with respect to a vertical direction;
a second antenna portion communicable with a mobile communication terminal including a communicable range broader than that of said first antenna portion, said second antenna portion being provided below said operating unit;
a third antenna portion capable of receiving the image data from said mobile communication terminal via wireless communication;
an outer cover configured to cover said first antenna portion and said second antenna portion and constituting at least a part of an outer casing of said image forming apparatus; and
a target portion provided on said outer cover and configured to function as a mark to which the mobile communication terminal is to be approached,
wherein said first antenna and said second antenna is capable of communicating a setting data for a connection authentication with said third antenna and the mobile communication terminal, and
wherein the mark is provided in a position where a communication range of said first antenna portion and a communication range of said second antenna portion are overlapped with each other.

19. An image forming apparatus according to claim 18, wherein said first antenna portion wirelessly communicates with the mobile communication terminal by using electromagnetic induction, and
wherein said second antenna portion wirelessly communicates with the mobile communication terminal by using Industrial, Scientific and Medical band.

* * * * *